Patented Oct. 16, 1934

1,976,875

UNITED STATES PATENT OFFICE 1,976,875

GEL AND METHOD OF MAKING SAME

Gerald C. Connolly and Jeremiah A. Pierce, Baltimore, Md., assignors, by mesne assignments, to Chester F. Hockley, receiver for The Silica Gel Corporation, Baltimore, Md., a corporation of Maryland No Drawing. Application March 18, 1931, Serial No. 523,646

22 Claims. (Cl. 23—139)

The present invention relates to adsorptive and/or catalytic gels and methods of preparing the same.

According to the usual method of preparing dried hydrous oxide gels, after the ingredients have been mixed, a reaction product forms which is liquid and termed the "sol". This sets or coagulates to a hydrogel, which is dried either before or after being washed with water.

If the ingredients are not taken in the proper proportions and concentrations, instead of the sol, the reaction product may be a precipitate or a mixture of precipitate and sol. The sol in this mixture may coagulate into the hydrogel form, thereby giving a gelatinous mass consisting of hydrogel and precipitate. Neither the precipitate alone, nor the mixture of hydrogel and precipitate, after being washed and dried, gives an end product having as desirable properties as the gel obtained via the hydrogel.

In preparing some hydrous oxide gels it is possible to obtain an intermediate reaction product in one of three forms, namely, a hydrogel exclusively, a preciptate exclusively, or a mixture of precipitate and hydrogel. In preparing other hydrous oxide gels, it is possible to obtain an intermediate reaction product in one of two forms, namely, a precipitate exclusively, or a mixture of precipitate and hydrogel. In preparing still other hydrous oxide gels, it is possible to obtain an intermediate reaction product in only one form, namely, a precipitate, gelatinous or otherwise, and this results although concentrations and proportions are employed such as to give a final product having a low oxide content and the mixing of the ingredients is effected at a low temperature and in a particular way.

The dried hydrous oxide gels, which, according to prior processes, are made via an intermediate reaction product consisting almost exclusively of a precipitate, are those containing an oxide of iron, aluminum, vanadium, copper, nickel, titanium, thorium, manganese, chromium, zirconium, etc., or mixtures of said oxides.

According to the process of the present invention it is possible to make hard, porous, dried gels with improved properties from the undesirable precipitates or mixtures of precipitates and hydrogels mentioned above.

Briefly stated, the process according to the present invention comprises treating a precipitate containing one or more hydrous oxides with a suitable organic acid to form a peptized mass, and nearly dehydrating said mass, before or after being washed.

The term "precipitate" as used herein is intended to include hydrous oxide precipitates which may consist exclusively of a precipitate, gelatinous or otherwise, or a mixture of precipitate and hydrogel.

The peptized mass resulting from the treatment may be in different forms. In some instances, the precipitate, when treated with a peptizing agent, is completely converted into a clear sol like the liquid reaction mass obtained, for example, by mixing solutions of sodium silicate and an acid in proper proportions and concentrations. In other instances, when the precipitate is treated with a peptizing agent, it becomes more translucent without changing completely into a clear liquid or sol. In still other instances, the precipitate appears to suffer no material change at all, but after standing or after heating sometimes "sets up" more firmly. In still other cases, the mass of precipitate has the same appearance as before the peptizing treatment, and no visible change in appearance is noted until after it has been dried. In some extreme instances, no visible change is apparent during or after the treatment of the precipitate with the peptizing agent, or even after the peptized precipitate has been dried. Whether or not this latter product presents superior adsorbent properties as compared to the product obtained from a non-peptized precipitate can only be determined by subjecting them to suitable adsorption tests, for example, the adsorption of water vapor out of an air mixture which is 20% or 50% saturated with said vapor.

If the conditions under which the peptizing treatment of the precipitate is effected are not perfect, the final product may consist of a mixture of true dried gel and dried precipitate in varying proportions. Although the final product obtained from a completely peptized precipitate is superior to the final product obtained from a partially peptized precipitate it is to be understood that all products obtained by partially peptizing the precipitate irrespective of the relative proportions of true dried gel and dried precipitate contained in such products are satisfactory, and are better adsorbents than the final products obtained from precipitates which have not been subjected to a peptizing treatment.

The term "dried gel" as used herein is intended to include dried products consisting of dried mixtures of hydrogel and precipitate as well as dried hydrogels, all made from more or less peptized masses.

The process of the present invention is of particular value in that it enables dried hydrous oxide gels to be made from any hydrous oxide precipitate irrespective of how produced. The precipitate employed may be made by reacting the ingredients capable of forming the desired hydrous oxide precipitate together in any proportions and concentrations, and in any manner. The ingredients may be mixed at a low temperature, say about zero degrees C., or at room temperature or at temperature above room temperature. The precipitate used in the process of the present invention may be the precipitate formed as an intermediate product in the manufacture of gels of any hydrous oxides, such as the oxide of iron, chromium, bismuth, aluminum, gallium, copper, nickel, beryllium, titanium, indium, zirconium, thorium, cerium, scandium, vanadium, manganese, silicon, germanium, tin, tantalum, molybdenum, tungsten, or the like, or mixtures of such oxides.

Some hydrous oxide gels, such as those of the oxides of silicon, titanium, germanium, tin, tantalum, molybdenum, tungsten, and pentavalent vanadium, are best prepared by reacting the ingredients capable of forming the desired hydrous gel under such conditions as to form an intermediate reaction product which is acid.

Other hydrous oxide gels, such as those of the oxides of iron, chromium, aluminum, gallium, indium, copper, nickel, beryllium, titanium, zirconium, thorium, cerium, scandium, manganese, and tetravalent vanadium, are best made by reacting the ingredients capable of forming the desired hydrous oxide gel under conditions such as to form an intermediate reaction product which is alkaline.

The hydrous oxide gels of the strongest amphoteric metals may be made by reacting the ingredients capable of forming the desired hydrous oxide gel under conditions such as to form a gelatinous precipitate that is either acid or alkaline. In making these gels the ingredients should be preferably employed in such proportions and concentrations that the acidity or alkalinity of the reaction mass is close to the neutral point.

Plural hydrous oxide gels containing two or more oxides of metals or non-metals, are prepared by reacting solutions of soluble salts of a plurality of certain metals or non-metals, previously mentioned, with either an alkali or its equivalent or an acid or acidic substance, in such proportions and concentrations as to form a reaction product consisting of a gelatinous precipitate exclusively or a mixture of a gelatinous precipitate and a hydrogel which is either acid or alkaline depending upon whether the reaction product is obtainable on the acid or alkaline side.

The precipitate to be peptized preferably, should be one which has been thoroughly washed, which may be effected with either cold or hot water, and in any manner, as by decantation, on a filter, or otherwise. Although a precipitate which has been thoroughly washed is preferred, it is to be understood that an unwashed or incompletely washed precipitate may also be used but the product obtained from a peptized unwashed or incompletely washed precipitate, while superior to a product obtained from a non-peptized precipitate, is not as good as the product obtained from a peptized completely washed precipitate.

The organic acid employed for peptizing the precipitate may be an acid of the aliphatic series, as for instance, formic, acetic, or a substituted aliphatic acid as chloracetic, etc.

The precipitate to be treated is generally that obtained from a reaction mass prepared in an alkaline medium. In the case of the precipitate containing an oxide or oxides of the stronger amphoteric metals which may be prepared under alkaline or acidic conditions, such precipitates may also be peptized by means of an organic acid. In other words, the precipitates containing an oxide of the stronger amphoteric metals whether prepared under alkaline or acidic conditions can be peptized with an organic acid.

The treatment of the precipitate with the peptizing agent may be effected in any suitable manner. Preferably, it should be carried out in such a way as to insure a most intimate and thorough commingling of the particles of the precipitate with the peptizing agent. A combination rubbing and stirring action has been found to give satisfactory results.

The precipitate may be mixed thoroughly with a small quantity of water before the peptizing agent is added. This insures a more complete treatment with a minimum amount of the agent. After peptization, it is preferred, although not necessary, to allow the peptized material to remain quiescent for a short time. It may then be dried in any suitable manner as by drying under a vacuum or in any other well known way. Preferably, the material is dried slowly until it hardens and then is activated at a higher temperature. This can be effected anywhere from 30° to 150° C. or higher. If desired, the excess peptizing agent may be removed from the peptized material prior to the drying step, as by draining, filtering, or centrifuging.

The peptized material, if desired, may be washed before or after drying. It is preferred not to wash before the drying as the operation is difficult due to the fact that the peptized material is often of poor structure. Also, it is preferred not to wash after drying unless the peptized material has been subjected to a final temperature of about 200° C. or higher. By using a peptizing agent which is volatilizable by heat, the peptized material may be dried immediately without any intermediate treatment.

The peptization treatment may be performed at various temperatures, for example from 10° to 95° C. and even higher or lower, depending upon the particular precipitate to be peptized.

The quantity of peptizing agent used is variable. In some cases, a large quantity of peptizing agent is employed while in other cases a small quantity is sufficient. When a large excess of peptizing agent is employed, the excess may be neutralized in whole or part before drying, or if desired, a substance may be added that reacts with a portion of the peptizing agent to form an inert salt.

The final dried products containing one or more of the oxides previously mentioned herein, obtained by the process of the present invention, are new. By prior processes, products containing one or more of said oxides, having a pore structure similar to that of true dried gels were not obtained, when the final products were secured from an intermediate reaction product consisting exclusively, or mostly of a precipitate. As previously stated, the final product obtained via peptization of a precipitate, has more desirable properties than the product obtained by drying a precipitate. For example, a dried gel of the oxide of a metal of the group containing iron, aluminum, manganese, copper, nickel, and zirconium obtained by the present process, after activation at 700° F. for 3 hours, takes up water vapor to such an extent as to contain about 20% by weight from an air mixture which is 20% saturated with water vapor at 25° C. The dried alumina product obtained by drying a precipitate, under the same conditions, takes up water vapor to such an extent as to contain only about 10% by weight. From an air mixture which is saturated with water vapor at 25° C., the alumina gel obtained by peptization according to the present invention, takes up water vapor to such an extent as to contain about 55% by weight; whereas the product made by drying a precipitate takes up water vapor to such an extent as to contain only about 30% by weight.

In adsorbng water vapor out of mixtures of air and water vapor, the point at which the efficiency of the adsorption begins to fall off is termed the "break point". The alumina gel made according to the present process will adsorb water vapor out of air mixtures at practically 100% efficiency for relatively long times. Expressed in other words, this alumina gel has practically 100% efficiency coupled with large capacity. This is very important where it is desired to remove the very last traces of moisture from air or other gases, or liquids.

Most gels, when heated to temperatures exceeding 600° F. become more dense and lose capacity for adsorption. This does not mean that these results occur after each heating, for, as a matter of fact, the capacity becomes constant after one or two heatings to the particular temperature. It is found that gels made in accordance with the present invention can be heated to higher temperatures than gels made by prior processes, without decreasing their capacity or high efficiency for removal of water vapor to any substantial extent. Thus, alumina gel made according to the present invention will still have a very high "clean-up" efficiency and large capacity even after activations at temperatures as high as 800° F. or even 1200° F. In some instances, in the removal of water vapor from gases, carbonaceous matter is present and carbonizes the gel. This cannot be effectively burned out without excessive heating of the gel. However, heating to 800° will accomplish this purpose, and inasmuch as the alumina gel of the present invention is not injured by such heating, it is of special value for removing water vapor under the conditions mentioned.

Thus, in addition to having very high efficiency and capacity when adsorbing water vapor from gases or liquids, it may be said that the alumina gel of the present invention is heat stable to relatively high temperatures.

An example of the process is as follows:

Example.

Equal volumes of a solution of aluminum sulphate of about 5% to 10% strength by weight and a 1 N. alkali solution, such as sodium or ammonium hydroxide, at a low temperature, preferably 0° C. or lower, as minus 5° C., are mixed together. The aluminum sulphate solution may be added to the alkali solution or vice versa, or the two solutions may be flowed together simultaneously at the proper rates. Care should be taken, however, that the reaction mass is slightly alkaline. Preferably, the mass should be agitated during mixing. A hydrated gelatinous precipitate of alumina is formed, which, either unwashed, partly washed, or thoroughly washed, is treated with an acetic peptizing agent, as for example, a weak solution of acetic acid. This treatment is effected by rubbing and stirring into the alumina precipitate a dilute solution of acetic acid in the ratio of, for instance, 100 cc. of an 8% acetic acid solution for 500 grams of the gelatinous alumina precipitate. It seems to be an advantage to secure a fine dissemination of the precipitate in the solution, so that the action of the peptizing agent will be more uniform. Preferably, the acidic agent and the precipitate are added to each other slowly with combined rubbing and stirring. The temperature at which this treatment is effected may vary from 20° to 95° C. Usually digesting for a number of hours, say about 1 to 2 hours, is sufficient to peptize the precipitate. The peptized mass, after a time, stiffens to the consistency of lard. The peptized mass is then nearly dehydrated in any well known manner, as passing air at 105° to 150° C. and higher over the same. If desired, it may be washed prior to or after the dehydration.

The alumina gel thus obtained after activation for 3 hours at 700° F. usually has a moisture content of about 3 to 10%, and will take up at least 12 to 15% more of its weight of water from a 20% saturated air mixture at 25° C. From a 50% saturated air mixture at 25° C., this same alumina gel wil take up at least 20% to 25% more of its weight of water.

Various specified details or procedure and conditions of operation have been set forth above for the purpose of giving a clear understanding of the process, but the invention is not limited to the exact details given, as it includes modifications and changes coming within the scope of the appended claims.

Having thus described the invention, what is claimed as new and desired to be secured by Letters Patent is:

1. The process of making a hard, dried gel consisting in treating a hydrous oxide precipitate with an organic acid to form a peptized mass, and nearly dehydrating said mass.

2. The process according to claim 1 wherein the organic acid is an organic acid of the aliphatic series.

3. The process according to claim 1 wherein the organic acid is acetic acid.

4. The process according to claim 1 wherein the organic acid is a substituted aliphatic acid.

5. The process according to claim 1 wherein the organic acid is chloracetic acid.

6. The process of making a hard, dried gel consisting in treating a hydrous oxide precipitate containing an amphoteric metal oxide with an organic acid to form a peptized mass, and nearly dehydrating said mass.

7. The process according to claim 6 wherein the organic acid is an organic acid of the aliphatic series.

8. The process according to claim 6 wherein the organic acid is acetic acid.

9. The process according to claim 6 wherein the organic acid is a substituted aliphatic acid.

10. The process according to claim 6 wherein the organic acid is chloracetic acid.

11. The process of making a hard, dried alumina gel consisting in treating a hydrous alumina precipitate with an organic acid to form a peptized mass, and nearly dehydrating said mass.

12. The process according to claim 11 wherein the organic acid is an organic acid of the aliphatic series.

13. The process according to claim 11 wherein the organic acid is acetic acid.

14. The process according to claim 11 wherein the organic acid is a substituted aliphatic acid.

15. The process according to claim 11 wherein the organic acid is chloracetic acid.

16. A hard, porous, adsorbent alumina gel, capable of taking up water vapor from a 20% saturated air mixture at 25° C. to such an extent as to contain about 20% water by weight of the dried gel.

17. A hard, porous, adsorbent gel containing an oxide of a metal of the group consisting of iron, aluminum, manganese, copper, nickel, zirconium, capable of taking up water vapor from a 20% saturated air mixture at 25° C. to such an extent as to contain about 20% water by weight of the dried gel.

18. A hard, porous, adsorbent alumina gel, capable of taking up water vapor from a 20% saturated air mixture at 25° C. to such an extent as to contain about 20% water by weight of the dried alumina, and about 55% by weight of water out of an air mixture saturated with water vapor at 25° C.

19. A hard, porous, adsorbent, alumina gel which after activation for 3 hours at 700° F. is capable of adsorbing at least 12% of its weight of water vapor from a 20% saturated air mixture at 25° C.

20. A hard, porous, adsorbent, alumina gel which after activation for 3 hours at 700° F. is capable of adsorbing at least 15% of its weight of water vapor from a 20% saturated air mixture at 25° C.

21. A hard, porous, adsorbent, alumina gel which after activation for 3 hours at 700° F. is capable of adsorbing at least 20% of its weight of water vapor from a 50% saturated air mixture at 25° C.

22. A hard, porous, adsorbent, alumina gel which after activation for 3 hours at 700° F. is capable of adsorbing at least 25% of its weight of water vapor from a 50% saturated air mixture at 25° C.

GERALD C. CONNOLLY.
JEREMIAH A. PIERCE.